United States Patent [19]

Schwenninger

[11] 3,925,049
[45] Dec. 9, 1975

[54] FLAT GLASS INSPECTION SYSTEM AND METHOD

[75] Inventor: Ronald L. Schwenninger, Cumberland, Md.

[73] Assignee: PPG Industries, Inc., Pittsburgh, Pa.

[22] Filed: July 10, 1974

[21] Appl. No.: 487,325

[52] U.S. Cl. .................. 65/29; 65/158; 356/200; 356/210; 356/239
[51] Int. Cl.² .................................... G01N 21/16
[58] Field of Search ........ 65/29, 158; 356/200, 210, 356/239

[56] References Cited
UNITED STATES PATENTS

| | | | |
|---|---|---|---|
| 2,247,047 | 6/1941 | Bishop, Jr. | 356/239 |
| 3,475,615 | 10/1969 | Samuel | 356/200 X |
| 3,533,706 | 10/1970 | Maltby, Jr. et al. | 356/239 |

*Primary Examiner*—Arthur D. Kellogg
*Attorney, Agent, or Firm*—Dennis G. Millman

[57] ABSTRACT

Flat glass is inspected for point type defects by passing a band of partially collimated light, whose rays lie in planes that are essentially normal to the surface of the glass and parallel to longitudinally extending drawline defects, through the glass at an acute angle with respect to the surface of the glass. Images cast on a viewing screen by distortion associated with point type defects are thereby selectively enhanced to permit rapid and accurate human inspection of glass for mirror quality.

12 Claims, 6 Drawing Figures

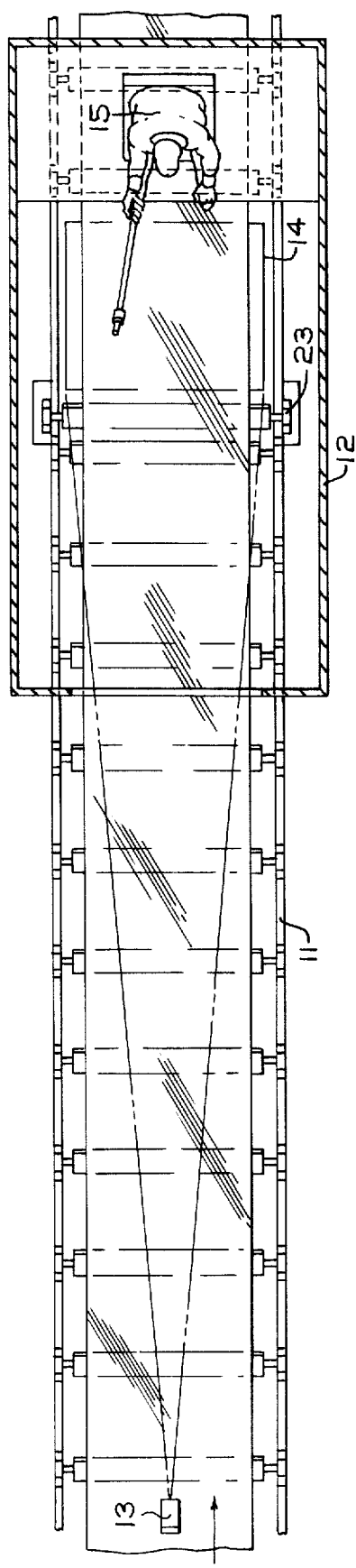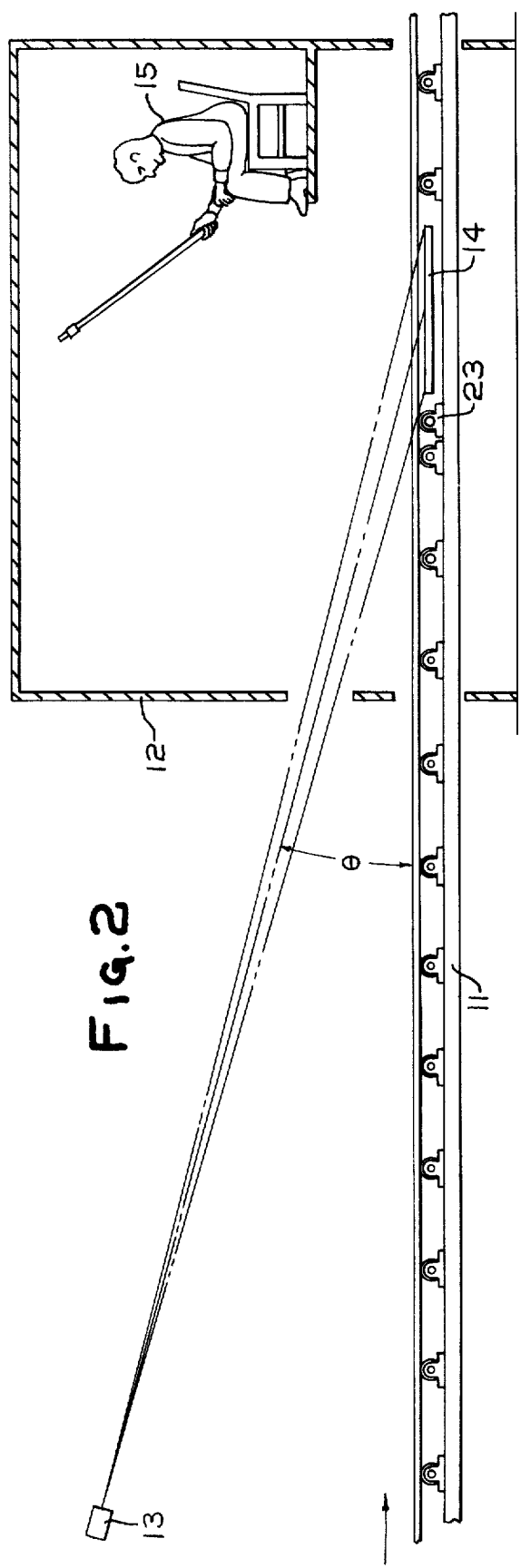

ns do not, however, provide for reliable detection of defect distortion less than 0.031 inch in magnitude. Inspection for mirror quality glass prior to this invention required slow and careful scrutiny of individual sheets under special lighting conditions, a technique that is time-consuming and cumbersome.

FLAT GLASS INSPECTION SYSTEM AND METHOD

BACKGROUND OF THE INVENTION

This invention relates to the inspection of flat glass for defects. More particularly, a system and method are provided for detecting very small point type defects that often went undetected with prior art systems, or at best were detected only by time-consuming piece-by-piece scrutiny. The invention is especially useful for inspecting continuous ribbons of float glass to meet the high standards set for use in mirror manufacturing.

Two types of defects frequently encountered in glass made by the float process are drawline defects and point defects. Drawline defects generally consist of cylindrical thickness variations whose axes extend longitudinally, i.e., in the direction of the "draw", or in other words, in the direction that the glass ribbon travels as it emerges from the melting tank and passes over the float bath. When drawline defects include elongated inhomogeneities within the glass, they are sometimes called "strings", "striae", or "ream". Point type defects may be on the surface or within the glass and include what have been called "stones", "knots", "boils", "blisters", "seeds", "bubbles", and "drip". Stones and knots are inclusions of solid matter in the glass while boils, blisters, bubbles and seeds are gaseous inclusions. Drip is a defect peculiar to the float process and is characterized by tiny areas of distortion at the surface which, it is theorized, are caused by particles of elemental tin or tin compounds dropping onto the glass surface in the float chamber. Drip in particular is often nearly invisible to the naked eye.

Satisfactory methods are known in the art for inspecting glass for drawline defects in general as well as for larger point defects in glass intended for architectural or automotive glazing. The standards for mirror quality glass, however, are considerably higher with respect to point defects. The standards for point defects in glass are sometimes expressed in terms of the diameter of the distortion associated with a defect when viewed normal to the surface of the glass at a distance of 36 inches. Defect distortion is not merely the visibility of a defect itself, nor the shadow of a defect, but it is the divergence or convergence of light rays caused by the lens effect of non-uniformities in the glass structure around a defect. Thus the distortion measurement may be several times larger than the actual diameter of the defect itself. The non-uniformities may act as a diverging lens or a converging lens, and often include compound curves such that both converging and diverging lens effects are exhibited. What is observed may be a bright spot, a dark spot, a bright spot surrounded by a dark ring, or a dark spot surrounded by a bright ring. The focal length for defect distortion is generally very large (on the order of 30 meters or more) thus observation of the distortion, for all practical purposes, takes place between the focal point and the glass.

Auto glass standards may typically call for defect distortation to be on the order of no more than 0.062 inch in diameter for bubbles and no more than 0.013 inch in diameter for stones, drip, and knots. Architectural glazing standards are usually less stringent. But mirror quality specifications may require defect distortion to be, for example, no more than 0.031 inch for bubbles and less than 0.010 inch for stones, drip, and knots. Prior art continuous production line inspection arrange- Automatic scanning devices have benn developed for inspection of continuous glass ribbons. Examples of such devices can be seen in the following U.S. Pat. Nos.:

3,166,627
3,199,401
3,202,043
3,609,380
3,656,854

Although some of such scanning devices may be made sensitive enough to detect defect distortion having a magnitude as small as about 0.010 inch, they are not capable at that degree of sensitivity of discriminating between very small defects and spurious interference such as dust particles and the like as a human inspector can. Furthermore, the very high cost of such a sensitive scanning device is prohibitive in view of the relatively small demand for mirror quality glass. Thus it is desired to provide a human inspector with means to enhance the visibility of very small point defects on a continuous production line basis.

For continuous inspection of a moving ribbon of glass, one typical prior art approach employed an intense light source above or below the glass to project light through the ribbon onto a viewing screen on the other side of the glass where images caused by defect distortion were cast. Such a system is generally satisfactory for automotive and architectural glass, but it does not render defect distortion less than 0.031 inch sufficiently visible to guarantee adequate inspection for better quality glass. Not only are the images created too small to be seen, but small defects are susceptible to being obscured by large drawline defects in the edge portions of the ribbon. This is because rays from the light source, although generally normal to the glass surface at the center of the ribbon, pass through the glass at oblique angles near the edge portions, which tends to render the much larger drawline defects there more visible, thereby overwhelming the images of any small point defects that may be located nearby.

U.S. Pat. No. 2,247,047 passes light through glass at an oblique angle transverse to the direction of draw or of glass travel so as to enhance the visibility of both drawline defects and point defects. Although this arrangement may be able to amplify the images cast by point defects to some extent, it does not avoid the overshadowing of small point defects by the larger drawline distortion images, and therefore its sensitivity is limited.

SUMMARY OF THE INVENTION

The present invention provides a method and means for inspecting glass for point type defects with a high degree of sensitivity. A band of light whose rays are essentially coplanar with drawline defects is projected through the glass at an acute angle with respect to the surface of the glass. A viewing screen on the opposite side of the glass from the light source receives the images cast by point type defect distortion, the visibility of which is greatly enhanced and free from interference from drawline defect images. The system is sensitive to defect distortion on the order of 0.005 to 0.010 inch in diameter.

DETAILED DESCRIPTION OF THE INVENTION

The invention will be fully understood from the following detailed description taken together with the drawings in which:

FIG. 1 is a plan view of one embodiment of the invention;

FIG. 2 is a longitudinal section through the embodiment of FIG. 1;

Figure 6:
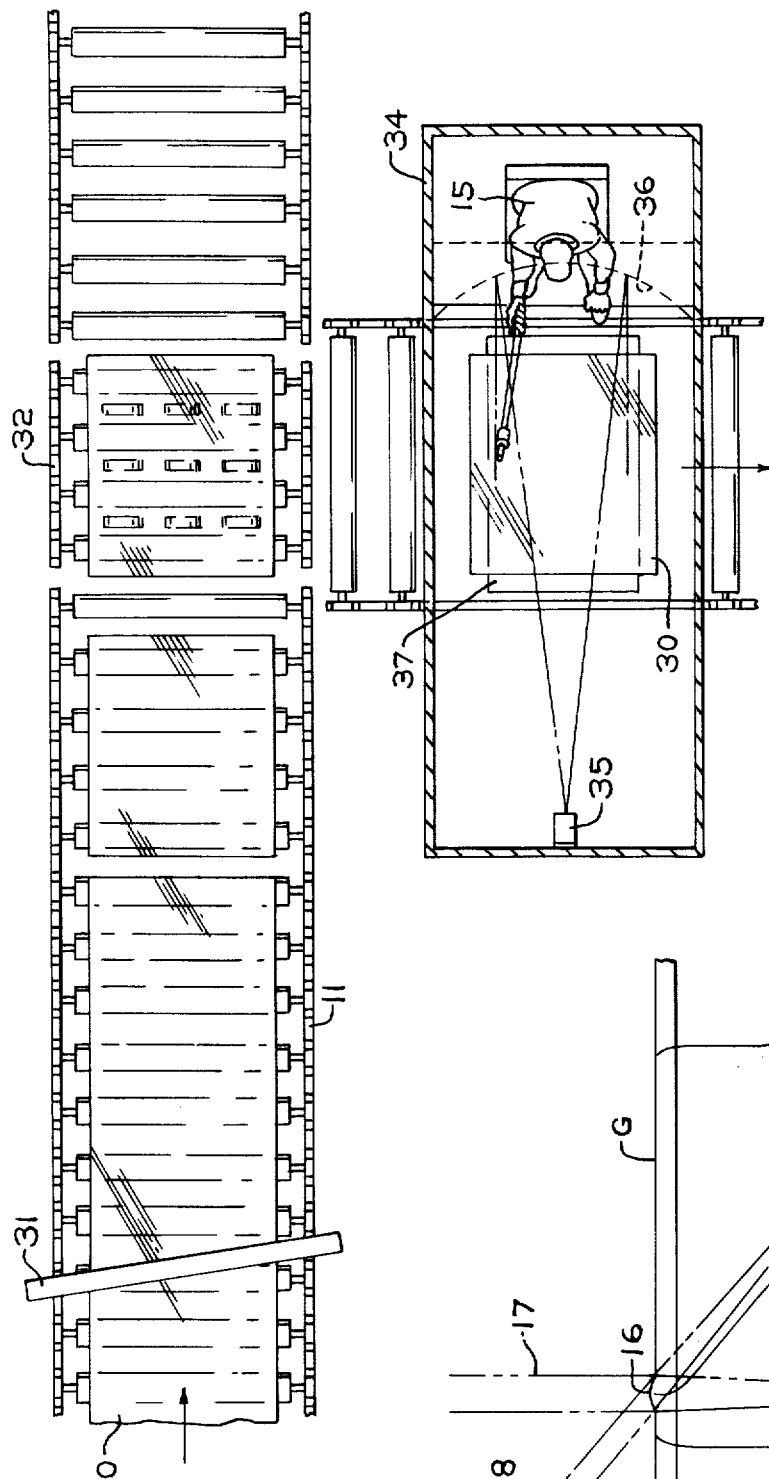
FIG. 6 is a plan view of an alternate embodiment for inspecting discrete pieces of glass.

A simplified version of the invention is depicted in FIGS. 1 and 2. A continuously moving ribbon of glass 10 is shown progressing on a conveyor 11 having driven rollers and passing through a darkened inspection booth 12 after having advanced from forming and annealing stages. An intense light source 13 is centered over the ribbon of glass and projects a beam of light through the glass so as to illuminate a substantial portion of a white viewing screen 14 located beneath the glass. Field stops may be utilized on the light source to confine the light beam to a generally rectangular band on the viewing screen which passes through substantially the full width of the ribbon of glass. An inspector 15 monitors the screen and marks any defects with a grease pencil or the like.

One important feature of the invention is that the light passes through the glass in essentially collimated form, i.e., the rays of light are nearly parallel to each other. This is accomplished in the embodiment of FIGS. 1 and 2 by employing a point light source that is located a great distance from the viewing screen so that the rays passing through the longitudinal edge portions of the glass will be nearly parallel to those passing through the center portions. This distance might, for example, be on the order of at least about 50 feet. By using light rays whose directions have very little transverse component relative to longitudinal drawline defects in the glass, interference from drawline defects is avoided since the distortion associated with drawline defects has optical power only in the transverse direction.

Figure 3:
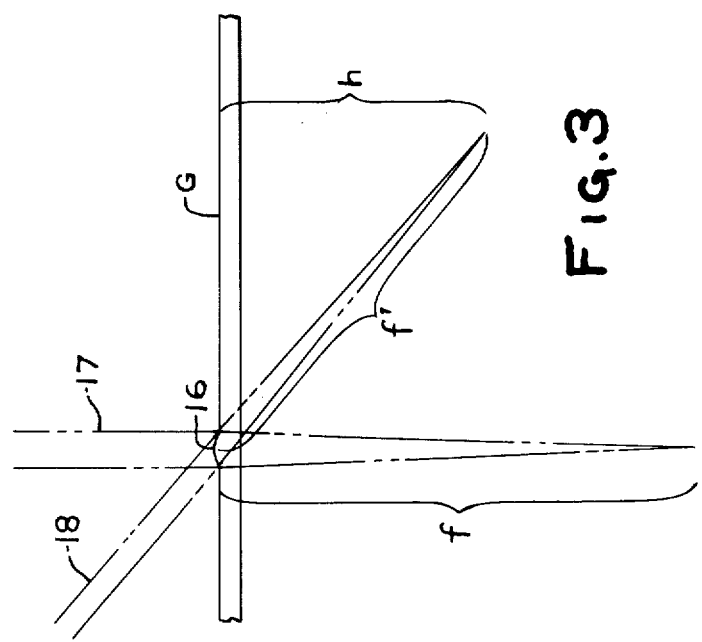
FIG. 3 is a schematic diagram illustrating the intensification of defect distortion images in accordance with the invention.

Another important feature of the invention relates to the angle $\theta$ (see FIG. 2), which is the angle between the surface of the glass and the chief ray of the light beam incident thereon. The angle $\theta$ is made acute, i.e., between 0° and 90° from the surface of the glass, so as to intensify the images cast on the screen by point defect distortions. The intensifying effect increases as the angle $\theta$ decreases, the best results being obtained when $\theta$ is less than 30°. It is impractical, however, to decrease the angle below about 10° because transmittance of light through the glass is greatly reduced at such very small angles. For example, a defect distortion exhibiting the properties of a converging lens with an optical power of one diopter (the reciprocal of the focal length) to light normal to the glass, will have a power of about 26 diopters when the angle $\theta 0$ is 15°. This effect is attributable to the principle of optics known as lens astigmatism, and may be seen graphically in the schematic ray diagram of FIG. 3. A sheet of glass G is shown with a convex defect distortion 16 (shown greatly exaggerated) on one surface. Incident rays of light 17 that are normal to the glass focus at a distance $f$ from the distortion. (FIG. 3 is not drawn to scale, since $f$ would typically be on the order of about 30 meters or more.) Classical thin lens theory would predict the foci to fall in a plane parallel to the glass at a distance $f$ at any angle of light incidence. But in reality, lens aberrations cause some of the light to focus closer to the glass, at a distance $h$, when the angle of incidence departs from normal. In the example above with $\theta$ equal to 15°, distortion having a focal length $f$ of 52 meters would actually focus some of the light at an effective length $f'$ of 2 meters, which is a distance $h$ from the glass equal to about ½ meter. The over-all effect is to concentrate a portion of the light into more intense images within practical distances from the glass. With diverging lens distortion, the converse effect occurs; light rays are diverted from the image at shorter distances from the glass, making a dark spot on the viewing screen even darker in contrast to the surrounding illumination. A theoretical discussion of the astigmatism effect may be found in *Fundamentals of Optics*, 3rd Ed., Jenkins, F. A., and White, H. E., McGraw-Hill, 1957, pp. 147–150.

The intensification of defect distortion renders detectable to the human eye small point defects that would previously have gone undetected. At the same time, the longitudinal orientation of the light source avoids similar intensification of drawline defect images, so that selective enhancement of point defect images is achieved. Inspection for drawline defects is provided for elsewhere using conventional techniques.

Figure 4:
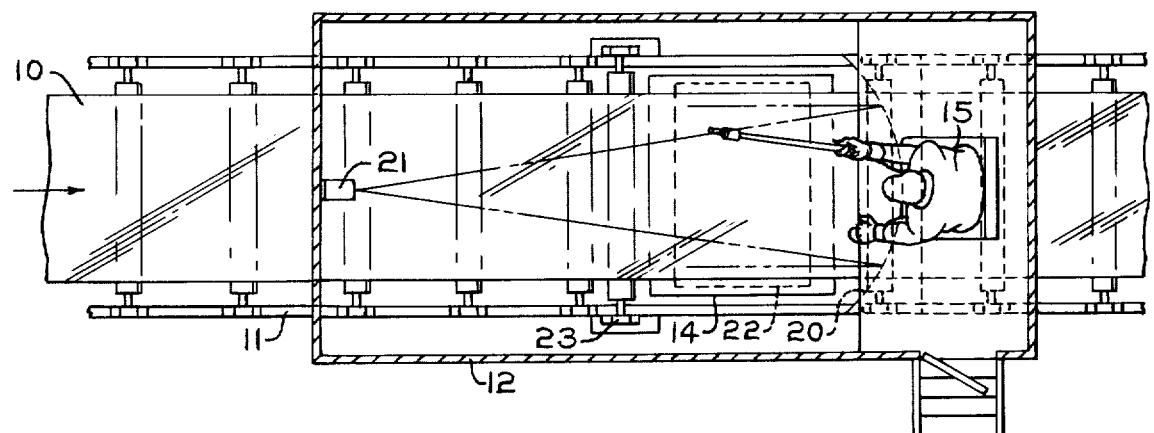
FIG. 4 is a plan view of a preferred embodiment of the invention.
Figure 5:
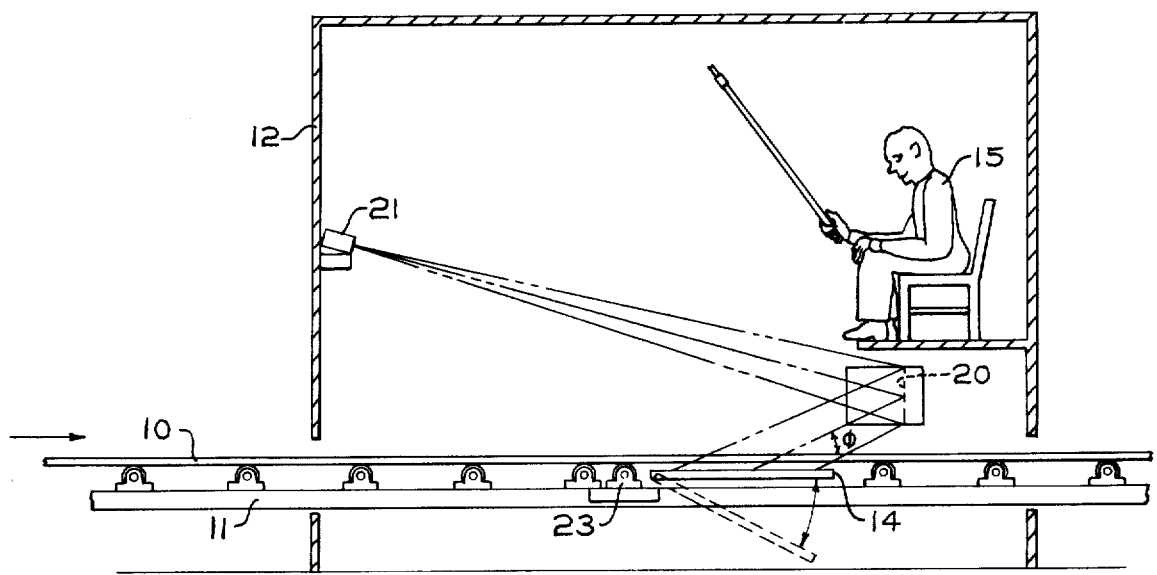
FIG. 5 is a longitudinal section through the embodiment of FIG. 4.

The system shown in FIGS. 1 and 2 could be made more compact by providing one or more mirrors to break the path of the light into several smaller segments forming a zig-zag path. An even more practical approach is shown in FIGS. 4 and 5 where a parabolic mirror 20 is employed to collimate light from a point source 21 located a relatively short distance from the mirror at a focal point of the mirror. The mirror should be at least as wide as the ribbon of glass so as to reflect a band of light onto substantially the entire width of the glass ribbon and to continuously illuminate an area on viewing screen 14 such as rectangular area 22 indicated by broken lines in FIG. 4. The parabolic mirror may be produced by bending a silvered, planar sheet of flat glass to an appropriate parabolic shape. It should be noted that the parabolic mirror arrangement need not produce light that is collimated in all planes, but that the light may be collimated in one critical direction only. When viewed from above as in FIG. 4, the reflected light rays all appear to be parallel to the longitudinal direction of the glass (discounting minor deviations due to imperfections in the mirror and the light source) and therefore do not transversely cross the longitudinally extending drawline defects and do not enhance their visibility. But, as can be seen in FIG. 5, the light rays may diverge within a given vertical plane, which will not cause adverse interference from drawline defects. In all of the embodiments it may be said that the light rays incident upon the glass lie in planes that are essentially longitudinal and normal to the surface of the glass. In FIG. 5, as in the previous embodiment, the angle $\phi$ between the center of the reflected beam of light and the glass surface is less than 90°, preferably about 10° to about 30°. In the specific embodiment of FIGS. 4 and 5, the optimum for angle φ was found to be about 14° when inspecting float glass.

One specific example of the preferred embodiment utilizes a mirror about twelve feet wide and ten inches high bent to a parabola having a focal length of about eight feet. The light source is a lamp rated at 400 watts and 18,000 candles/sq. cm. having an effective source width of 1.5 mm. Such a system permitted inspectors to reliably detect and mark point defects having distortion as small as 0.010 inch and some point defects having distortion as small as 0.005 inch.

The viewing screen may be close to or spaced from the underside of the glass, and it may be parallel to or slope away from the surface of the glass. Spacing the screen close to (on the order of an inch or two) and parallel to the glass is advantageous for the sake of keeping the image of a defect on the screen near the defect itself so as to expedite locating and marking the defect. Spacing the screen farther from the glass (within the focal length) increases the intensification of images, but since both converging and diverging lens effects are exhibited by defect distortion, the spacing is preferably limited to a distance at which both the converging and diverging images are about equally sharp. In the specific example set forth above, a spacing of about 10 to about 20 inches has been satisfactorily employed. Alternatively, the viewing screen may be tilted to face the inspector as represented by broken lines in FIG. 5. This possesses the advantage of making the defect image appear to travel more slowly over the viewing screen, thereby rendering it easier to locate and mark the defect, and because one end of the screen is spaced farther from the glass, some additional, varying intensification of the images is also achieved. In a specific example of the preferred embodiment, the viewing screen is spaced 20 inches from the glass along the edge closest to the inspector and ten inches from the glass along the opposite edge.

The lack of support between successive conveyor rollers due to the space required for the viewing screen 14 can lead to severe glass breakage in the event of an accidental upstream ribbon break. The broken edge tends to sag over the gap in the conveyor and catch on the next roller. To counter this hazard, one roll 23 of the conveyors in FIGS. 1, 2, 4 and 5 is translatably mounted so as to be able to move forward and fill the gap when a break occurs. Pneumatic means (not shown) are provided for advancing roll 23 and for lowering screen 14 out of the path of the roll.

This invention may also be adapted for inspecting discrete pieces of flat glass on a continuous or intermittent basis. Depicted in FIG. 6 is a layout that includes means to laterally convey pieces of glass, such as piece 30, after being severed from ribbon 10 by means of a cutting bridge 31. A transfer table 32 removes selected pieces of glass from the main line conveyor 11 and transfers them onto a branch line conveyor 33. An inspection booth 34 includes a light source 35, a parabolic mirror 36, and a viewing screen 37 in basically the same relationship as in the embodiment of FIGS. 4 and 5, with the angled light rays being aligned essentially parallel to the longitudinal drawline defects in the glass. But in FIG. 6, the glass travels through the illuminated area in the transverse direction rather than longitudinally.

It will be evident that the invention may also be adapted to a non-continuous inspection arrangement, whereby the glass remains static and the illumination scans the glass, e.g., by means of an oscillating parabolic mirror.

It is to be understood that other modifications and variations as are known to those of skill in the art may be resorted to without departing from the spirit and scope of the invention as defined by the appended claims.

I claim:

1. A method for detecting the presence of point type defects having distortion diameters as small as 0.010 inch in flat glass having both point type defects and elongated drawline defects comprising:
   orienting the flat glass between a light source and a viewing screen with the drawline defects extending in a longitudinal direction;
   continuously projecting light through the glass in a transversely extending band across the full width of glass to be inspected, the rays of said light having an acute angle of incidence with respect to the surface of the glass sufficient to enhance the optical power of point type defects in the glass and to thereby render images cast by small point type defects visually perceptible, the rays of said light also lying in planes that are essentially parallel to the drawline defects and normal to the surface of the glass so as to avoid substantial enhancement of the optical power of the drawline defects;
   receiving said light rays on said viewing screen after they have passed through the glass and casting onto said viewing screen images created by optical distortion associated with point type defects, without substantial interference from drawline defect images; and
   visually monitoring the viewing screen for images cast thereon.

2. The method of claim 1 wherein said glass is a continuous ribbon moving in the longitudinal direction.

3. The method of claim 1 wherein the projecting of said light includes directing light onto a parabolic mirror from which the light is reflected and then passed through the glass and onto said viewing screen.

4. The method of claim 3 wherein said parabolic mirror substantially spans the full width of said glass whereby said band of light is projected onto substantially the full width of said glass.

5. The method of claim 4 wherein said glass is a continuous ribbon moving in the longitudinal direction.

6. The method of claim 5 wherein said angle of incidence is less than about 30° at the center of said light beam.

7. The method of claim 1 wherein said glass is a discrete piece being conveyed in the transverse direction.

8. A system for inspecting flat glass for the presence of small point type defects without substantial interference from elongated drawline defects, comprising:
   conveyor means for transporting flat glass in a longitudinal direction in a predetermined glass-transporting plane;
   light projecting means on one side of said glass-transporting plane for projecting through the glass a band of light across the full transverse width of the area of the glass-transporting plane subject to examination, said projecting means being oriented so as to direct the rays of the band of light toward said glass transporting plane at acute angles thereto sufficient to enhance the optical power of point type defects in the glass and render images cast by the point type defects visually perceptible, and so as to intersect the glass-transporting plane with the rays in substantially parallel, longitudinally extending planes normal to the glass transporting plane; and a viewing screen disposed on the other side of the glass-transporting plane and aligned with the path of the projected rays of the band of light so as to receive the defect distortion images cast by point type defects.

9. The system of claim 8 wherein said light projecting means includes a light source longitudinally spaced from said viewing screen.

10. The system of claim 9 wherein said light projecting means includes a parabolic mirror mounted so as to receive light rays from said light source and reflect them onto said viewing screen.

11. The system of claim 9 wherein said viewing screen is disposed beneath said glass-transporting plane and is spaced therefrom about one inch to about twenty inches.

12. The system of claim 9 wherein said light source is mounted so as to project light rays at an angle of less than 30° to the glass-transporting plane.

* * * * *